Feb. 26, 1924.
L. J. ROSSITER
VALVE
Filed July 10, 1922
1,484,997
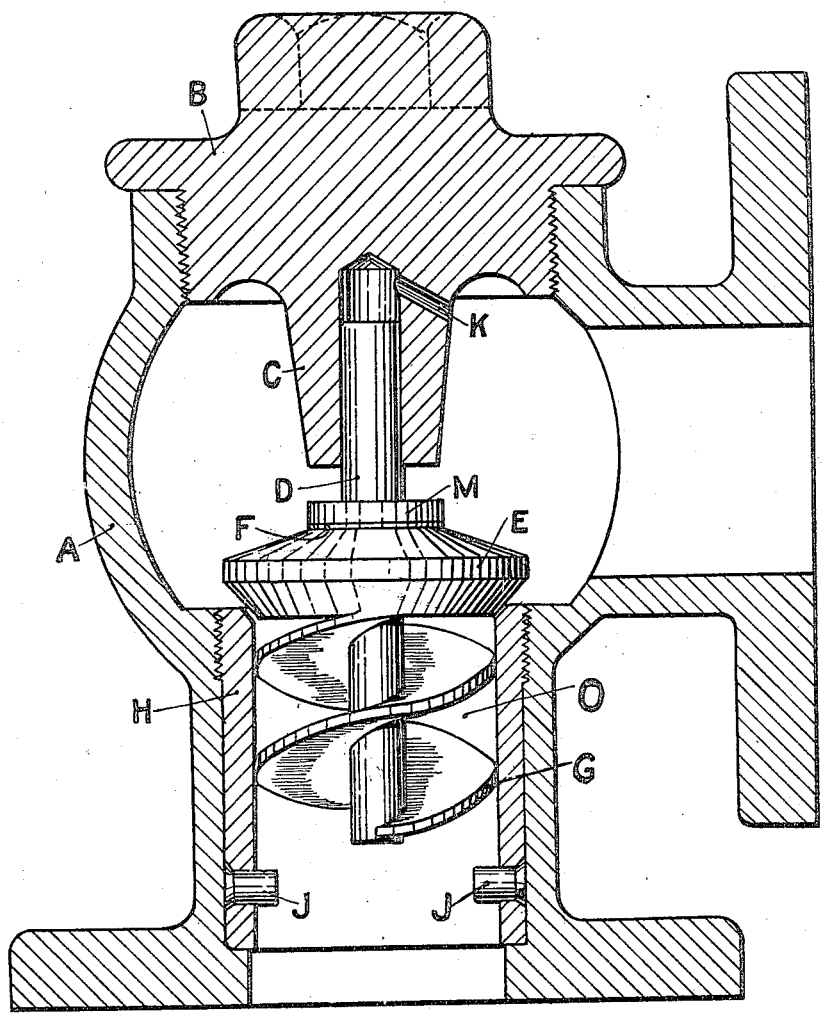

Patented Feb. 26, 1924.

1,484,997

UNITED STATES PATENT OFFICE.

LEWIS JAMES ROSSITER, OF ERSKINEVILLE, NEW SOUTH WALES, AUSTRALIA.

VALVE.

Application filed July 10, 1922. Serial No. 573,876.

*To all whom it may concern:*

Be it known that I, LEWIS JAMES ROSSITER, a subject of the King of Great Britain and Ireland, and resident of 14 Rochford Street, Erskineville, in the State of New South Wales, Commonwealth of Australia, have invented certain new and useful Improvements in Valves (for which I have filed application in Australia, No. 2540, on 8th July, A. D. 1921), of which the following is a specification.

The object of this invention is to provide a non-return valve in which wear of the moving parts is reduced to a minimum and such wear as there may be taken by an easily renewable and inexpensive item, and in which means are provided in the seat to facilitate the insertion and removal of the same.

With these objects my invention consists in a valve comprising the combination of parts hereinafter described illustrated in the accompanying drawing and particularly defined in the appended claim.

In the drawing, which is a sectional view of my valve, A represents a valve body of conventional type fitted with a screwed cap B which has on its underside a tubular projection C serving as a lift-limiting stop and also as a guide receiving the stem D which projects upwardly from the valve E. Below the valve is a guide stem G formed to provide helical fluid passages O and sildably fitting in the cylindrical seat-bush H which is screwed into the body. The body has an inlet opening 1 at one end, an outlet opening 2 at one side and a chamber 3 with which said openings communicate and in which the valve E is located.

In the lower portion of said seat-bush are a pair of internally projecting and diametrically opposed pins J affording gripping means for a suitable key of known type by which the bush may be screwed in and out. It will be observed that the said bush is let into a recess in the body so that the sectional area of the valve inlet is not diminished except by the pins aforesaid.

Fluid passing through the valve traverses the helical passages O and by so doing rotates the valve E as the latter lifts, so that said valve E does not repeatedly seat in the same angular position as in an ordinary valve. Consequently the wear on said valve E and seat is evenly distributed and the life of these parts prolonged. I find however that the rotary frictional contact of the valve E with the end of the tubular guide C results in the wearing of an annular groove in the top of the valve about the base of stem D. As this groove becomes deeper the permitted lift of the valve increases, its efficiency is impaired, and early renewal is necessitated.

Means for avoiding this necessity constitute the most important feature of my invention, such means consisting of a washer M freely fitting on the upper stem D of the valve and interposed between the end of guide C and the valve E of which part at least of the upper surface is made flat as shown at F to form a bearing surface for the washer.

Thus the washer M contacts with the guide C and the wear which may result from such frictional contact, instead of being taken by the valve E as heretofore, is taken up by said washer which being a simple inexpensive item may (when necessary) be replaced with a minimum of expense.

The lift of the valve is determined by the distance between the upper surface of the washer M and the lower end of guide C.

As is common practice a vent hole K permits escape of fluid from the upper end of the bore of guide C as the valve E lifts.

What I claim and desire to secure by Letters Patent is:

In a non-return valve the combination of a body having an inlet opening at one end, an outlet opening at one side and a chamber having a downwardly projecting tubular guide, a cylindrical seat-bush fitted in said inlet opening, a valve in said chamber having a guiding element at one side arranged in said seat bush and connecting helical blades forming a helical passage therebetween open at the ends, said valve having a stem on the upper side slidably and rotatably engaging in the bore of said tubular guide, said helical blades and passage causing liquid flowing through the inlet opening axially of said helical blades to impart rotary movement to the valve as the latter is lifted from said seat, and a floating washer loosely fitted on said stem and arranged between the valve and the tubular guide, the opposing ends of the valve and said guide being plane.

Signed at Sydney, N. S. W., this twentieth day of May, A. D. 1922.

LEWIS JAMES ROSSITER.